June 1, 1943. S. E. CARLSON 2,320,567
INTERNAL SAFETY VALVE SYSTEM
Filed Sept. 2, 1941 4 Sheets-Sheet 1
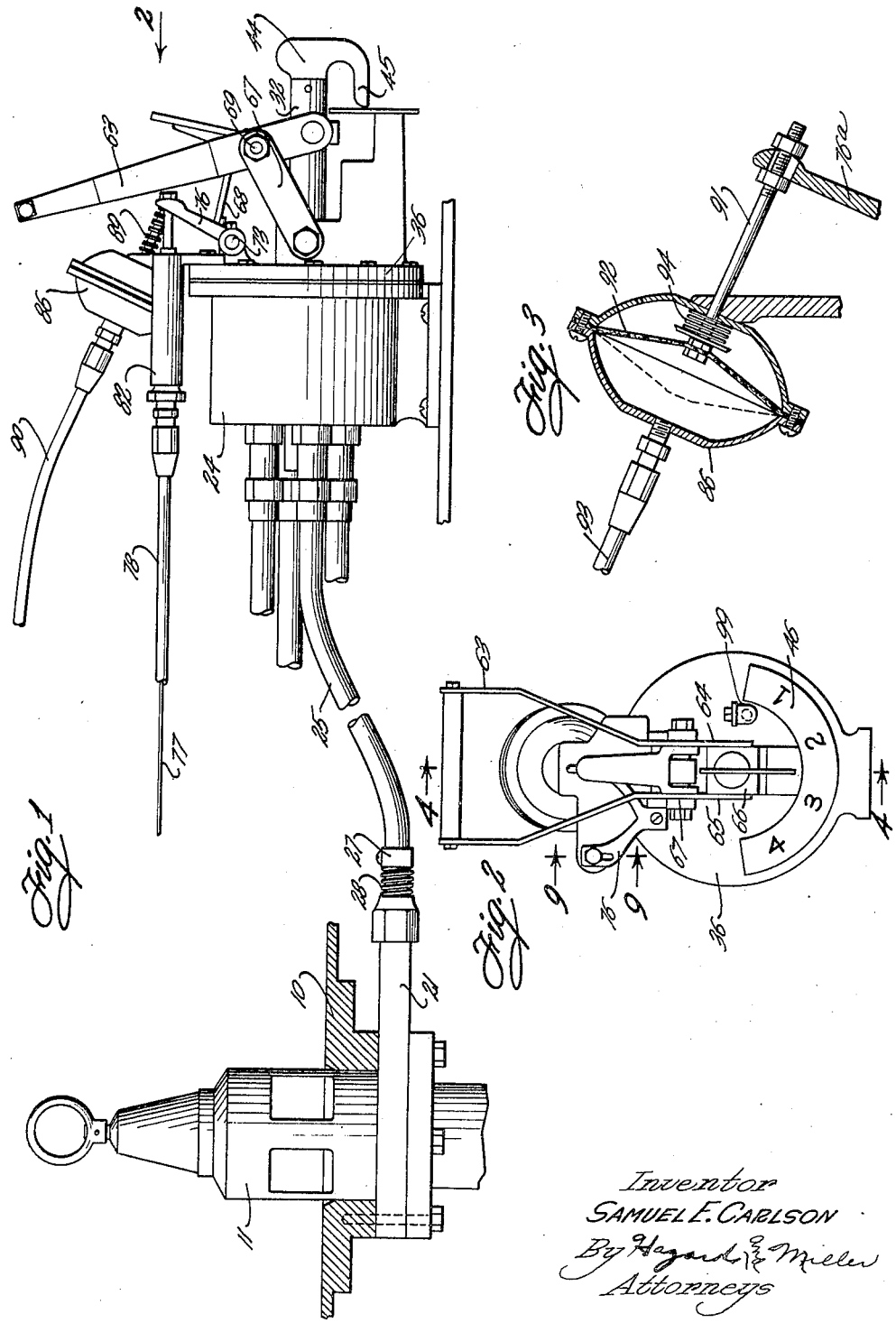
Inventor
SAMUEL E. CARLSON
By Hazard & Miller
Attorneys

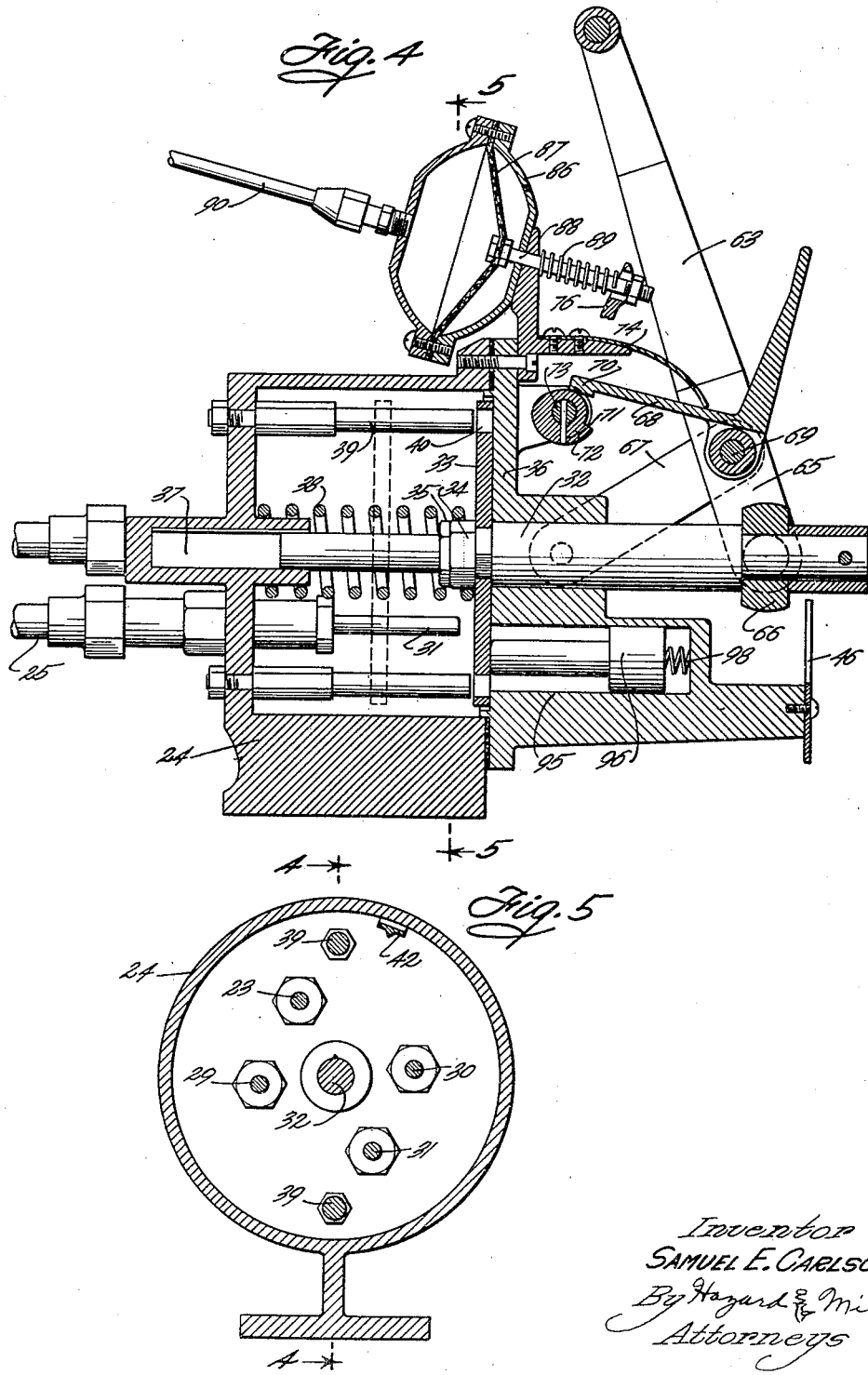

June 1, 1943.  S. E. CARLSON  2,320,567
INTERNAL SAFETY VALVE SYSTEM
Filed Sept. 2, 1941  4 Sheets-Sheet 3
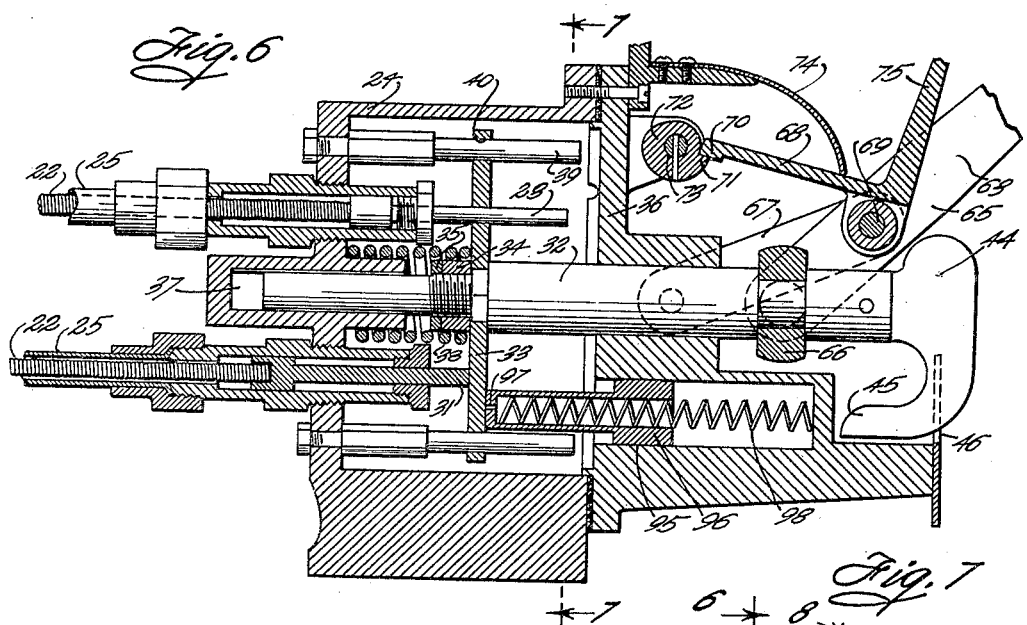
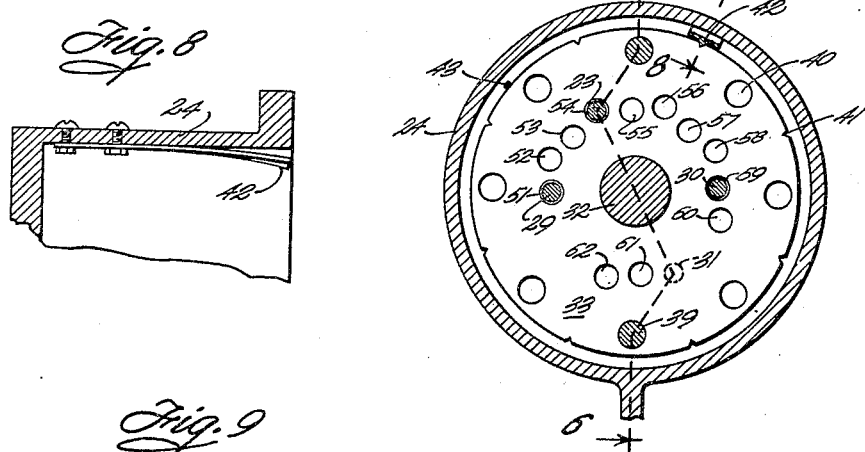
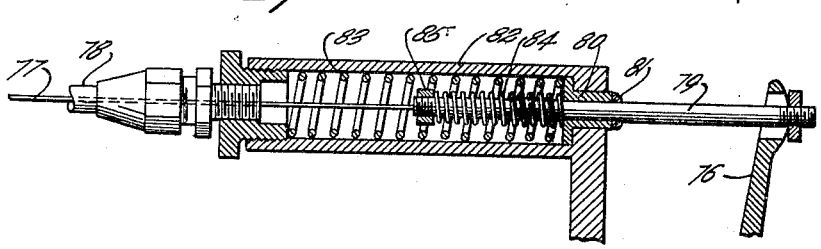
Inventor
SAMUEL E. CARLSON
By Hazard & Miller
Attorneys

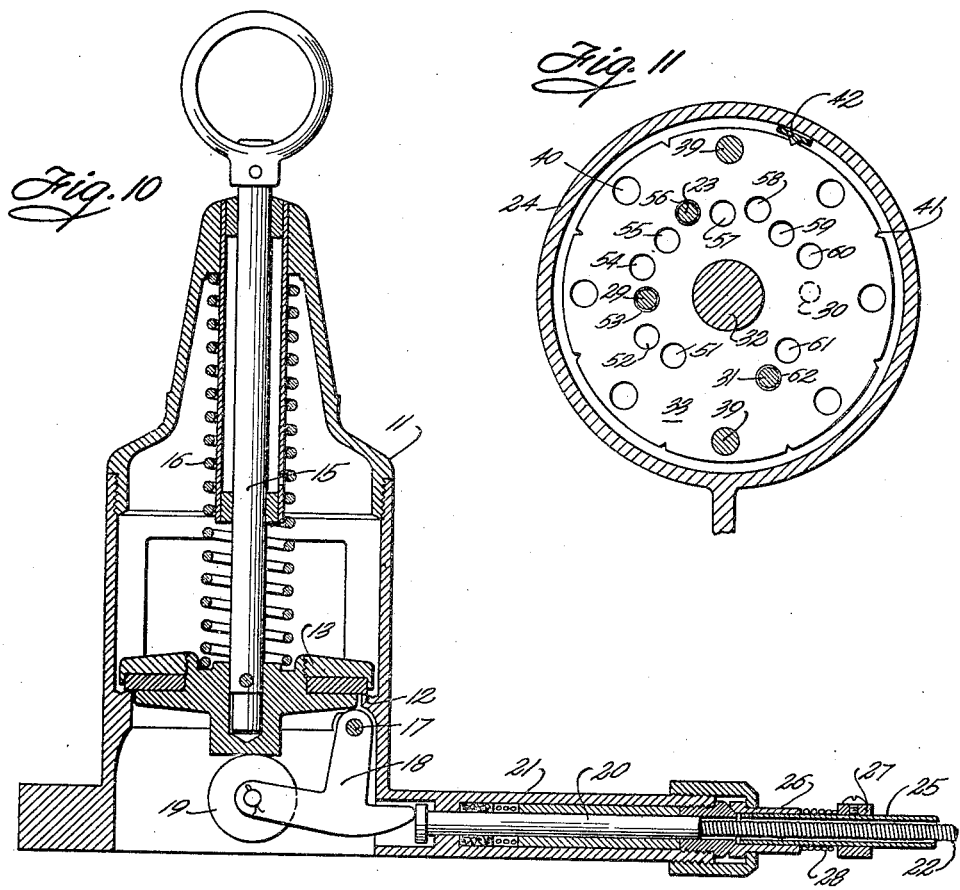

Patented June 1, 1943

2,320,567

UNITED STATES PATENT OFFICE 2,320,567

INTERNAL SAFETY VALVE SYSTEM

Samuel E. Carlson, Alhambra, Calif.

Application September 2, 1941, Serial No. 409,201

8 Claims. (Cl. 137—21)

This invention relates to an internal safety valve system for use on tank trucks, trailers, and the like.

It is now customary to transport various liquids, such as oils and liquid fuels, by means of tank trucks and trailers wherein the tank of the truck or trailer, as the case may be, is divided into separate compartments, each compartment being normally equipped with an outlet valve urged into closed position by means of a spring. It is highly desirable to be able to open any one of the outlet valves for the various compartments selectively from a single location using a simple operating mechanism which is operatively connected by a selector to a motion-transmitting device which will open the valve selected.

A primary object of the present invention is to provide an improved form of construction wherein the outlet valves of the various compartments of a tank truck or trailer may be selectively operated by mechanical means from a single convenient location.

Another object of the invention is to provide the means that selectively operates the outlet valves of the compartment of a tank truck or trailer with safety devices that will bring about an automatic closing of the valves in the event that certain conditions occur. These outlet valves, when opened, are releasably locked in open position being thus held open while the contents of their respective compartments are drained or are being pumped from the compartments. In the event that the truck or trailer is moved involving a starting of the engine of the truck it is desirable that any outlet valve that may be opened be automatically closed upon the starting of the engine so that the fluid being emptied from the compartment will not be expelled rendering a great fire hazard in the event that the fluid is inflammable.

Another object of the invention is to provide a means for automatically releasing the operating mechanism to allow the valve to automatically close in the event that the engine of the truck is started or the air brakes, if the truck is equipped with air brakes, are released or in the event that a part of the tank truck or trailer is subjected to abnormally high temperatures.

Another object of the invention is to provide a selective operating mechanism for selectively opening the outlet valves of the compartments of a tank which is of relatively simple and durable construction and which may be mounted on any truck or trailer and connected to the outlet valves thereon which outlet valves are now somewhat standardized.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation, parts being broken away, illustrating the construction embodying the present invention;

Fig. 2 is a view in elevation of the selector mechanism and may be regarded as having been taken in the direction of the arrow 2 upon Fig. 1;

Fig. 3 is a sectional view through a diaphragm mechanism that may form a part of the present invention in the event that the truck or trailer is equipped with air brakes;

Fig. 4 is a sectional view through the selective operating mechanism taken substantially upon the line 4—4 upon Fig. 2 in the direction indicated;

Fig. 5 is a sectional view through the selector mechanism taken substantially upon the line 5—5 upon Fig. 4 in the direction indicated;

Fig. 6 is a view similar to Fig. 4, but illustrating the selector mechanism as having been operated to open one of the valves of a tank truck or trailer, and may also be regarded as having been taken substantially upon the broken line 6—6 upon Fig. 7;

Fig. 7 is a sectional view taken substantially upon the line 7—7 upon Fig. 6 in the direction indicated;

Fig. 8 is a partial view in section taken upon the line 8—8 upon Fig. 7 to illustrate a detail of construction;

Fig. 9 is a sectional view through a part of a releasing construction and is taken substantially upon the line 9—9 upon Fig. 2;

Fig. 10 is a vertical section through a typical form of valve for one of the compartments of the tank truck or trailer; and Figs. 11, 12, and 13 are views similar to Fig. 7, but illustrating the rotary selector as having been turned into positions for operating other valves than that illustrated in Fig. 7.

Referring to the accompanying drawings wherein similar reference characters designate similar parts throughout, 10 indicates the bottom of a tank, such as is normally present on a truck or trailer for transporting liquids. In the conventional tank truck the tank is divided into individual compartments, a typical tank having four compartments in the bottom of each of which there is a valve having a cage 11 and a valve seat 12. The valve body is indicated at 13 and may be made up of one or more parts, it being customary to equip it with a resilient material that engages the seat 12 to effect a tight closure. The stem 15 of the valve extends upwardly through the cage and the valve is urged into closed position by means of a coiled compression spring 16. Beneath the seat 12 there is pivoted at 17 a bellcrank 18 carrying a roller 19 engageable with the bottom of the valve 13. This bellcrank is forced in a clockwise direction as viewed in Fig. 10 by means of a push rod 20 that is slidable in a housing 21 that may be part of the cage 11. It will be understood that there is one outlet valve, such as that above described, for each compartment of a tank truck or trailer. The push rods 20 for the various valves are connected through a motion-transmitting device such as a coiled wire cable 22 to a push rod or head 23. The push rods or heads 23 for the various valves are located closely adjacent each other within a suitable housing 24 and the cables 22 are preferably enclosed within tubes 25 which lead from the housings 21 to the housing 24. Where the tubes 25 connect to the housings 21 there are preferably bushings 26. These bushings are fastened onto the ends of their respective tubes 25 by means of readily fusible solder. Collars 27 are rigidly fastened on the tubes 25 adjacent the bushings and coil springs 28 are compressed between the bushings and the collar.

The purpose of the above-described construction is as follows. If a push is imparted to the motor-transmitting cable 22 so that the push rod 20 is moved from right to left as viewed in Fig. 10, the bellcrank 18 will force the valve 13 open against the action of the coil spring 16. If the cable 22 is released coil spring 16 is effective to automatically close the valve. In the event that the bushing 26 is subjected to excessive temperature, such as being near fire, the soldered joint between the bushing and the tube 25 melts, allowing spring 28 to become effective to slide the end of the tubing 25 out of bushing 26. This is equivalent to releasing the cable 22, allowing the spring 16 to automatically close valve 13 whenever the bushing 26 is subjected to excessive temperatures.

In the event that the tank truck or trailer has its tank divided into four compartments there are four push rods or heads 23 in the housing 24. These heads are arranged around a central axis and for purposes of clarity they have been separately identified as 23, 29, 30, and 31. The axis around which the push rods or heads are arranged is coincident with the longitudinal axis of a slidable shaft 32 having its end reduced and flatted to receive a perforated selector plate 33 held in place by means of a nut and jamb nut 34 and 35 threaded onto the reduced forward end of the shaft. The shaft is slidable through the cover 36 on the housing and has its forward end slidably socketed in the back of the housing 24 as indicated at 37. A compression spring 38 is compressed between the back of the housing and the forward side of the selector plate 33 urging the shaft 32 outwardly or into a position closely adjacent the cover 36. Guide rods 39 are mounted on the back of the housing and extend toward the cover 36 having their ends spaced therefrom a distance slightly in excess of the width or thickness of the selector plate 33. Normally only two guide rods are necessary, these being arranged at the top and bottom of the housing.

The selector plate has a series of outer apertures 40 which are arranged to allow the guide rods 39 to pass therethrough. The selector plate is also equipped with a plurality of peripheral notches 41 engageable by a spring detent 42 fastened to the interior of the housing adjacent the top thereof. Thus, when the selector plate 33 is against the inside of the cover 36 it may be rotated by the shaft 32 into any one of a number of different positions. These positions are established by the detent 42 snapping into any one of the notches 41 and in this position top and bottom apertures 40 will be in registry with the ends of the guide rods 39 permitting the selector plate to be forced forwardly. During such forward movement the selector plate slides upon and is guided by the guide rods 39. The periphery of the selector plate may also be equipped with a stop 43 engageable with the detent 42 to limit rotation of the selector plate. The shaft 32 can be rotated into any desired position so as to properly position the selector plate 33 by means of a handle 44 on its outer end carrying an index pointer 45 adapted to swing adjacent a scale 46, see Fig. 2, on which the various positions may be marked.

Within the outer row of perforations 40 there are inner perforations 51 to 62, inclusive, formed in the selector plate. These perforations bear a definite relationship to the positions of the push rods or heads 23, 29, 30 and 31. Thus if the shaft 32 is rotated by the handle 44 into the position wherein the selector plate 33 occupies that position illustrated in Fig. 7, push rods 29, 23, and 30 will be in registry with apertures 51, 54, and 59, respectively. Push rod 31 however will not be exposed but will be opposite an unperforated portion of the selector plate adjacent perforation 61. Consequently if the shaft 32 is forced forwardly the selector plate will slide not only upon the guide rods 39 but will slide over the push rods 29, 23, and 30 imparting no forward movement to them whatsoever. Push rod or head 31, however, will be forced forwardly as shown in Fig. 6, transmitting motion to its cable 22, push rod 20, and opening its valve. Similarly, if the shaft 32 is rotated by handle 44 so as to cause the selector plate 33 to assume the position illustrated in Fig. 11, the selector plate on being forced forwardly will merely slide upon the guide rods 39 and over the push rods or heads 23, 29, and 31. Push rod or head 30 will not be exposed and will consequently be forced forwardly, transmitting motion to its cable and opening its valve. In a like manner if the selector plate is rotated to assume the position illustrated in Fig. 12, and then forced forwardly, push rod 23 will be actuated and push rods 29, 30, and 31 will be left undisturbed as these are exposed by apertures 61, 55, and 58, respectively.

Fig. 13 illustrates the position of the selector plate wherein push rod 29 may be actuated and push rods 23, 30, 31 left undisturbed. The layout of the perforations 51 to 62 is governed by the position and location of the heads or push rods 23, 29, 30, and 31, and while I have illustrated only four of such push rods or heads, it will be understood that the number may be increased or decreased.

As a means of forcing the shaft 32 forwardly to overcome the action of the spring 38 in the housing 24 and the action of the spring 16 on the valve, a lever 63 is provided having opposed legs 64 and 65, see Fig. 2, pivotally mounted on opposite sides of a collar 66 that is rotatable with respect to the shaft 32. Links 67 are pivotally connected to lever 63 and to a boss on the cover 36. Thus, if the lever is swung from the position illustrated in Fig. 1 to the position illustrated in Fig. 6, the shaft 32 will be forced forwardly with considerable mechanical advantage, the selector plate pushing the selector push rod or head forwardly and causing its valve to be opened.

As a means for locking the lever 63 in valve-opening position a latch 68 is pivoted as at 69 upon the lever carrying a head 70 engageable with the notch 71 in a cam 72 which is pinned upon a transverse shaft 73 mounted on a cover. A leaf spring 74 is engageable with the latch urging it in a counterclockwise direction as viewed in Fig. 6 so that it will be held in the notch 71 on the cam. The upstanding arm of the latch 75 provides a means by which the latch may be swung to overcome the action of spring 74 and cause it to disengage the cam allowing shaft 32 to be forced outwardly or into its normal position illustrated in Fig. 1. When the lever however has assumed the position illustrated in Fig. 6, the latch will be caused to engage the cam by means of spring 74 and thus be releasably locked in that position that will hold the selected valve open.

On the shaft 73 there is an arm 76 that is adapted to rotate the shaft and thus rotate the cam to lift the head 70 and thus disengage the latch and release lever 63 under any one of varying circumstances. Thus, if it is desired to be able to close the opened valve from a point in the cab of a tank truck, lever 76 may be connected by a tension wire 77 leading through tubing 78 to a point in the cab of the truck. In the preferred form of construction the end of the wire that is attached to the lever is enclosed in a tube or sleeve 79 that extends through a bushing 80 that is attached to the sleeve or tube 79 by readily fusible solder 81. A spring housing 82 encloses a spring 83 engageable with the flange of the bushing 80 urging the tube 79 into that position wherein arm 76 will hold cam 72 in the position illustrated in Fig. 6. Thus, by pulling on the wire 77 arms 76 can be swung forwardly to rotate cam 72 and disengage the latch. A coil spring 84 is compressed between bushing 80 and a collar 85 on the tube 79 and serves when the fusible solder 81 becomes heated to such an extent that it will melt to force tube 79 forwardly and thus rotate arm 76 to latch-releasing position even though no tension may have been applied to wire 77.

The latch may be released in other manners also. There may be mounted on the cover a container 86 enclosing a diaphragm 87 to which is connected a rod 88 that is connected to the arm 76. The arm to which the rod 88 is connected may be either the arm 76 to which wire 77 is connected or it may be another arm on the shaft 73. A coil spring 89 urges rod 88 into such a position that the latch may engage the notch 71 on the cam and remain in locking position. The opposite side of the housing 86 is connected by a tube 90 to the intake manifold of the motor or engine of the tank truck so that when the motor or engine is operating, the vacuum in the intake manifold will be effective on the forward side of the diaphragm 87. An air bleeder port is in the opposite side of the housing so that whenever the engine of the truck is operating the diaphragm is effective to pull upon the rod 88 and rotate the shaft 73, thus rotating the cam into latch-releasing position. In this way, if the outlet valve from any compartment of the tank should be inadvertently left open and the engine of the tank truck started, the operating mechanism will be automatically released or unlocked to permit the valve to close itself.

Alternatively, or in addition to the above-mentioned safety devices, the shaft 73 may be operated automatically upon the release of the air brakes of the truck or trailer if the truck or trailer is equipped with air brakes. To this end I have illustrated in Fig. 3 the shaft 73 as being equipped with an arm 76a which is connected by a rod 91 to a diaphragm 92, one side of which is exposed to air pressure delivered through a tube 93 which is connected to the air brake system. A compression spring 94 is operable upon the diaphragm 92 in opposition to the air pressure. When the air pressure is applied the diaphragm assumes a position illustrated in Fig. 3 wherein the arm 76a moves to the position required to hold the cam 72 in locking position. Upon release of the air brakes spring 94 is effective to return the diaphragm 92 and move the arm 76a to turn cam 72 and automatically release the latch. In this manner, if the valve is inadvertently left open and the air brakes of the truck are released the operating lever 63 is automatically unlocked to allow the valve that may be open to automatically close itself.

Whenever the lever 63 is released the spring 16 and the spring 38 are both effective to return the selector plate 33 to its position against the cover 36 as shown in Fig. 4. As both of these springs are relatively heavy springs it is desirable to dampen the return movement of the selector spring. To this end a cylinder 95 is formed in the cover that contains a piston 96 equipped with a bleeder port 97. Coil spring 98 urges the piston into engagement with the selector plate 33 so that when the selector plate is moved forwardly as illustrated in Fig. 6, the piston follows the selector plate. The interior of the housing 24 is preferably filled with oil supplied through a filler nipple 99. When the piston moves forwardly the oil seeps past the piston so as to be entrapped to some extent within the cylinder. Consequently, whenever shaft 32 is released to be forced rearwardly by the spring 38, although the oil within the cylinder 95 can escape the rate of escape is retarded and this acts as a dampening means or a dashpot that retards the rate of return movement.

From the above-described construction it will be appreciated that a mechanical means has been provided by which the outlet valves controlling the outlets from tank compartments of a tank truck or trailer can be selectively operated by a single operating mechanism which, when it opens, any one of the outlet valves can be locked in open position. The locking means may be readily unlocked manually or unlocked by the starting of the engine of the tank truck, the release of the air brakes by remote manual control, or by various parts being subjected to excessive temperatures. In this way, in the event that the truck is started while an outlet valve is open provision is made for automatically allowing that valve to close.

Various changes may be made in the details of construction without departing from the spirit or scope of the invention as defined by the appended claims.

I claim:

1. In combination with a tank truck, trailer, or the like, having tank compartments provided with outlet valves, a single operating means for opening the valves, and selector means for selectively connecting the operating means to any one of the valves so that the valve may be opened thereby, spring means urging the valves and operating means into valve-closing position, means for locking the operating means in valve-opening position, and means operable by the operation of the engine of the tank truck for releasing the valve operating means to allow any open valve to close.

2. In combination with a tank truck, trailer, or the like having tank compartments provided with outlet valves, motion-transmitting means for opening the valves leading to a common location, heads on the motion-transmitting means at the common location, a rotary selector having apertures therethrough through which the non-selected heads are capable of passing adapted upon rotation to engage a selected head, means for forcing the selector against the selected head to impart motion to its motion-transmitting device and cause its valve to be opened, means for releasably locking the last-mentioned means in valve-opening position, and means for releasing the locking means operable upon the starting of the engine of the truck.

3. In combination with a tank truck, trailer, or the like having tank compartments provided with outlet valves, motion-transmitting means for opening the valves leading to a common location, heads on the motion-transmitting means at the common location, a rotary selector having apertures therethrough through which the non-selected heads are capable of passing adapted upon rotation to engage a selected head, means for forcing the selector against the selected head to impart motion to its motion-transmitting device and cause its valve to be opened, means for releasably locking the last-mentioned means in valve-opening position, and means for unlocking the locking means operable upon the release of the air brakes of the truck.

4. In combination with a tank truck, trailer, or the like having tank compartments provided with outlet valves, motion-transmitting means for opening the valves leading to a common location, heads on the motion-transmitting means at the common location, a rotary selector having apertures therethrough through which the non-selected heads are capable of passing adapted upon rotation to engage a selected head, means for forcing the selector against the selected head to impart motion to its motion-transmitting device and cause its valve to be opened, means for releasably locking the last-mentioned means in valve-opening position, and means for unlocking the locking means operable upon a part being subjected to excessive temperatures.

5. A selector mechanism comprising a plurality of longitudinally movable means each adapted to be pushed to operate a device connected thereto, push rods at the ends of each longitudinally movable means, the push rods being arranged at a common location and within the circumference of a selector plate, a rotatably adjustable selector plate opposite the ends of the push rods, said selector plate having apertures formed therethrough in groups so arranged that upon properly positioning the selector plate at least one of the push rods may be pushed thereby to cause its respective device to be operated and the remaining push rods may pass through their respective apertures in the plate without being disturbed thereby, guide pins adjacent the push rods, there being apertures in the selector plate adapted to receive the guide pins so as to be guided thereby in each of its selected positions.

6. In combination with a tank truck, trailer, or the like having tank compartments provided with outlet valves, a single operating means for opening selected valves, selector means for selectively connecting the operating means to any one of the valves so that the valve may be opened thereby, spring means urging the valves and the operating means into valve closing position, means for locking the operating means in valve opening position, and diaphragm operable means for releasing the valve operating means to allow any open valve to close.

7. In combination with a tank truck, trailer, or the like having tank compartments provided with outlet valves, a single operating means for opening selected valves, selector means for selectively connecting the operating means to any one of the valves so that the valve may be opened thereby, spring means urging the valves and the operating means into valve closing position, means for locking the operating means in valve opening position, and diaphragm operable means for releasing the valve operating means to allow any open valve to close, said diaphragm means being operatively connected to the air brake system of the tank truck so as to release the valve operating means in response to the release of the brakes of the tank truck.

8. In combination with a tank truck, trailer, or the like having tank compartments provided with outlet valves, a single operating means for opening selected valves, selector means for selectively connecting the operating means to any one of the valves so that the valve may be opened thereby, spring means urging the valves and the operating means into valve closing position, means for locking the operating means in valve opening position, and diaphragm operable means for releasing the valve operating means to allow any open valve to close, said diaphragm means being operatively connected to the intake manifold of the tank truck so as to release the valve operating means in response to the starting of the engine of the tank truck.

SAMUEL E. CARLSON.